(12) United States Patent
Aughton et al.

(10) Patent No.: US 12,449,399 B2
(45) Date of Patent: Oct. 21, 2025

(54) METHOD AND SYSTEM FOR DETERMINING SURFACE LEVEL AND SOIL INFILTRATION UNDER IRRIGATION

(71) Applicant: RUBICON RESEARCH PTY LTD, Hawthorn East (AU)

(72) Inventors: David John Aughton, Hawthorn East (AU); Joel Michael Delacorn, Hawthorn East (AU)

(73) Assignee: RUBICON RESEARCH PTY LTD, Hawthorn East (AU)

( * ) Notice: Subject to any disclaimer, the term of this patent is extended or adjusted under 35 U.S.C. 154(b) by 342 days.

(21) Appl. No.: 17/638,054

(22) PCT Filed: Aug. 28, 2020

(86) PCT No.: PCT/AU2020/050909
§ 371 (c)(1),
(2) Date: Feb. 24, 2022

(87) PCT Pub. No.: WO2021/035309
PCT Pub. Date: Mar. 4, 2021

(65) Prior Publication Data
US 2022/0276203 A1    Sep. 1, 2022

(30) Foreign Application Priority Data

Aug. 29, 2019   (AU) .................................. 2019903172
Oct. 24, 2019   (AU) .................................. 2019904003

(51) Int. Cl.
*G01N 29/032*   (2006.01)
*A01G 25/16*    (2006.01)
(Continued)

(52) U.S. Cl.
CPC ........... *G01N 29/032* (2013.01); *A01G 25/16* (2013.01); *A01G 25/167* (2013.01);
(Continued)

(58) Field of Classification Search
CPC ...... G01N 29/032; G01N 29/02; G01N 29/14; G01N 29/44; G01N 33/246; G01F 23/296;
(Continued)

(56) References Cited

U.S. PATENT DOCUMENTS 4,457,102 A * 7/1984 Ploeger, Jr. ............... A01G 7/00
                                                         47/32.7
4,804,050 A * 2/1989 Kerfoot .................... E21B 7/26
                                                         175/21
(Continued)

FOREIGN PATENT DOCUMENTS

CN      203274843 U    11/2013
CN      108522230 A     9/2018
(Continued)

OTHER PUBLICATIONS

Translation of CN203274843.*
(Continued)

*Primary Examiner* — Helen C Kwok
(74) *Attorney, Agent, or Firm* — David D. Brush; Westman, Champlin & Koehler, P.A.

(57) ABSTRACT

A device to determine a surface level of an area subject to flood, furrow, border-check or surface irrigation. The device includes an open-ended tube partially insertable into a hole in the soil to be irrigated. The tube has a plurality of perforations along its length and periphery to allow water entering perforations from above ground level to fill the tube. A housing is secured to the other end the of tube and contains a programmable ultrasonic transducer for transmitting and receiving acoustic signals from the water level within the tube. The housing has electronic circuitry and wireless communication elements to control the programmable ultrasonic transducer. The surface level and depth of water flowing along the surface level can be determined by (Continued)

monitoring a change point at which increases in monitored water levels slow, after a rapid increase of the monitored water levels, and by the difference in monitored water levels.

14 Claims, 9 Drawing Sheets

(51) Int. Cl.
| | |
|---|---|
| G01F 23/296 | (2022.01) |
| G01F 23/80 | (2022.01) |
| G01N 29/02 | (2006.01) |
| G01N 29/14 | (2006.01) |
| G01N 29/44 | (2006.01) |
| G01N 33/24 | (2006.01) |

(52) U.S. Cl.
CPC ............ *G01F 23/296* (2013.01); *G01F 23/80* (2022.01); *G01N 29/02* (2013.01); *G01N 29/14* (2013.01); *G01N 29/44* (2013.01); *G01N 33/246* (2013.01)

(58) Field of Classification Search
CPC ... G01F 23/804; G01F 23/80; A01G 25/1067; A01G 25/16
See application file for complete search history.

(56) References Cited

U.S. PATENT DOCUMENTS

| | | | | |
|---|---|---|---|---|
| 5,267,184 A * | 11/1993 | Matsushiro | ........... | G06T 11/203 |
| | | | | 708/270 |
| 5,341,831 A * | 8/1994 | Zur | ...................... | A01G 25/167 |
| | | | | 239/63 |
| 5,481,927 A * | 1/1996 | Hubbell | .................. | E21B 43/00 |
| | | | | 166/264 |
| 5,882,141 A * | 3/1999 | Byles | ...................... | E02B 13/00 |
| | | | | 239/562 |
| 6,601,440 B1 | 8/2003 | Chuang | | |
| 8,915,131 B2 | 12/2014 | Aughton et al. | | |
| 2004/0145379 A1* | 7/2004 | Buss | .................... | G01N 33/246 |
| | | | | 324/664 |
| 2005/0120813 A1* | 6/2005 | Clark | ....................... | G01N 3/40 |
| | | | | 73/866.5 |
| 2006/0046397 A1* | 3/2006 | Chang | ............... | H01L 29/66621 |
| | | | | 257/E21.429 |
| 2009/0107725 A1* | 4/2009 | Christy | ................... | E21B 49/00 |
| | | | | 175/50 |
| 2011/0043230 A1* | 2/2011 | Morton | ................ | G01N 33/246 |
| | | | | 324/694 |
| 2011/0050257 A1* | 3/2011 | Ashworth | ............ | G01N 27/223 |
| | | | | 324/689 |
| 2012/0152012 A1 | 6/2012 | Aughton et al. | | |
| 2013/0272791 A1* | 10/2013 | Bayley | ................... | A01G 25/02 |
| | | | | 405/37 |
| 2017/0044894 A1 | 2/2017 | Surowinski et al. | | |
| 2018/0057379 A1* | 3/2018 | Upadhyay | ............... | C02F 3/327 |
| 2018/0328513 A1* | 11/2018 | Emory | .................. | F16K 31/084 |
| 2018/0368339 A1* | 12/2018 | van der Lee | ........ | A01G 25/167 |
| 2022/0178903 A1* | 6/2022 | Burns | .................... | G01N 33/24 |

FOREIGN PATENT DOCUMENTS

| | | |
|---|---|---|
| JP | H09327242 A | 12/1997 |
| JP | 2017166834 A * | 9/2017 |
| KR | 100428534 B1 | 4/2004 |
| WO | 2011026177 A1 | 3/2011 |

OTHER PUBLICATIONS

Extended European Search Report dated Nov. 2, 2023 for corresponding European Application No. 20858796.4.
Rubicon: "How does the FlumeGate control canal flow and water levels?", Dec. 12, 2017 (Dec. 12, 2017), XP093094857.
International Search Report dated Oct. 2, 2020 for corresponding International Application No. PCT/AU2020/050909, Aug. 28, 2020.
Written Opinion of the International Searching Authority dated Oct. 2, 2020 for corresponding International Application No. PCT/AU2020/050909, filed Aug. 28, 2020.
Australian Search Report dated Nov. 1, 2019 for corresponding Australian Application No. 2019903172, filed Aug. 29, 2019.
European Communication pursuant to Article 94(3) EPC dated Mar. 31, 2025 for corresponding European Application No. 20858796.4.
Indian examination report under sections 12 & 13 dated Jan. 27, 2025, for corresponding Indian Application No. 202217010742, filed Feb. 28, 2022.

* cited by examiner

METHOD AND SYSTEM FOR DETERMINING SURFACE LEVEL AND SOIL INFILTRATION UNDER IRRIGATION

CROSS-REFERENCE TO RELATED APPLICATIONS

This Application is a Section 371 National Stage Application of International Application No. PCT/AU2020/050909, filed Aug. 28, 2020, which is incorporated by reference in its entirety and published as WO 2021/035309 A1 on Mar. 4, 2021, in English.

FIELD

The present invention relates to methods and systems for determining surface level of water and soil infiltration characteristics of soil under irrigation.

BACKGROUND

The present invention is an extension of the methods and systems for determining surface level of water and a soil moisture sensor disclosed in our International Patent Application No. PCT/AU2010/001125, the full contents including description, claims and drawings of which publication are assumed to have been read and incorporated herein by reference to avoid repetition of description. This patent specification, in the preferred embodiment, discloses a closed measuring cup set into the ground and below ground level of an irrigation bay. A water level sensor is located within the cup to detect the level of water passing at that point with the water level sensor being monitored as part of a computer controlled irrigation system. The water level sensor will initially measure the depth of water in the cup, until the cup fills, where it will measure the depth of water passing over the cup. There will be a rapid rise in level as the cup fills, and a more gradual rise thereafter, when the water front passes over the cup. The point of change will allow the ground level to be determined. The depth of water above ground level can then be determined by subtracting the surface level detection point from the sensor measurement.

It is not admitted that any of the information in this patent specification is common general knowledge, or that the person skilled in the art could be reasonably expected to ascertain or understand it, regard it as relevant, or combine it in any way before the priority date.

SUMMARY OF THE INVENTION

In one aspect of the invention there is provided a device for determining a surface level of an area subject to flood, furrow, border-check or surface irrigation, said device including an open ended tube, to be, in use, partially inserted into a hole in the soil to be irrigated, said tube having a plurality of perforations along its length and periphery to allow water entering perforations from above ground level to fill said tube, a housing secured to the other end of said tube containing a programmable ultrasonic transducer for transmitting and receiving acoustic signals from the water level within said tube, said housing having electronic circuitry and wireless communication elements to control said programmable ultrasonic transducer, said surface level can be determined by monitoring water levels within said tube by the change point at which increases in monitored water levels slow, after a rapid increase of the monitored water levels, and the depth of water flowing along the surface level is determined by the difference in monitored water levels and the determined change point and provide measured characteristics to a remote networked computer system.

In a preferred embodiment said plurality of perforations are longitudinal slots and said longitudinal slots are typically arranged in opposing pairs along the length of the tube.

Preferably the rate at which the water drains from the tube, as measured by said programmable ultrasonic transducer, provides a relative measure of the infiltration characteristics of the soil and the infiltration rate may be used to determine soil type.

In a further aspect of the invention there is provided a surface irrigation device to determine the water infiltration rate into soil being irrigated, said device including an open ended tube, to be, in use, partially inserted into a hole in the soil to be irrigated, said tube having a plurality of perforations along its length and periphery to allow water entering perforations from above ground level to fill said tube, a housing secured to the other end of said tube containing a programmable ultrasonic transducer for transmitting and receiving acoustic signals from the water level within said tube, said housing having electronic circuitry and wireless communication elements to control said programmable ultrasonic transducer and provide measured characteristics to a remote networked computer system.

In a preferred embodiment said plurality of perforations are longitudinal slots and said longitudinal slots are typically arranged in opposing pairs along the length of the tube.

Preferably the rate at which the water drains from the tube, as measured by said programmable ultrasonic transducer, provides a relative measure of the infiltration characteristics of the soil and the infiltration rate may be used to determine soil type.

In another preferred aspect the surface level of an area subject to flood, furrow, border-check or surface irrigation can be determined by monitoring water levels within said tube by the change point at which increases in monitored water levels slow, after a rapid increase of the monitored water levels, and the depth of water flowing along the surface level is determined by the difference in monitored water levels and the determined change point.

The invention also provides a surface irrigation detector device for determining water advance along an area to be irrigated, said device including an open ended tube, to be, in use, partially inserted into a hole in soil to be irrigated, said tube having a plurality of perforations along its length and periphery to allow water entering perforations from above ground level to fill said tube, a housing secured to the other end of said tube containing a programmable ultrasonic transducer for transmitting and receiving acoustic signals from the water level within said tube, said housing having electronic circuitry and wireless communication elements to control said programmable ultrasonic transducer and provide measured characteristics to a remote networked computer system.

In a practical embodiment said measured characteristics include the depth of water in said tube whereby a predetermined detected depth of water in said tube will indicate arrival of a water front of said water advance along said area being irrigated.

In a further embodiment there is provided an irrigation measurement device to determine water advance along an area to be irrigated, said device including a first open ended tube, to be, in use, partially inserted into a second open ended tube that is adapted to be inserted into a hole in soil to be irrigated, whereby water enters through a circumferential inlet gap between said first and second tubes with air escaping from the top of said first tube allowing said first tube to fill and normalise to the water level inside said second tube, a housing secured to the other end of said first tube containing a programmable ultrasonic transducer for transmitting and receiving acoustic signals from the water level within said first tube, said housing having electronic circuitry and wireless communication elements to control said programmable ultrasonic transducer and provide measured characteristics to a remote networked computer system.

In yet a further embodiment there is provided an irrigation measurement device to determine water advance along an area to be irrigated, said device including a first open ended tube, to be, in use, partially inserted into a second open ended tube that is adapted to be inserted into a hole in soil to be irrigated, said first tube having a plurality of perforations along its length and periphery to allow water to enter said perforations, whereby water enters through a circumferential inlet gap between said first and second tubes and said perforations of said first tube allowing said first tube to fill, a housing secured to the other end of said first tube containing a programmable ultrasonic transducer for transmitting and receiving acoustic signals from the water level within said first tube, said housing having electronic circuitry and wireless communication elements to control said programmable ultrasonic transducer and provide measured characteristics to a remote networked computer system.

Preferably said second tube has a first circumferential flange at one end to seal said hole. The first tube includes external protruding ledges or second circumferential flange which seat on said first circumferential flange to define the depth of entry of said first tube into said second tube.

Each irrigation measurement device may have an antenna included with the wireless communication elements. Temperature and humidity sensors may be located in the tube attached to said housing.

BRIEF DESCRIPTION OF DRAWINGS

An embodiment of the method and apparatus will now be described by way of example only with reference to the accompanying drawings in which.

DESCRIPTION OF EMBODIMENTS

Figure 1:
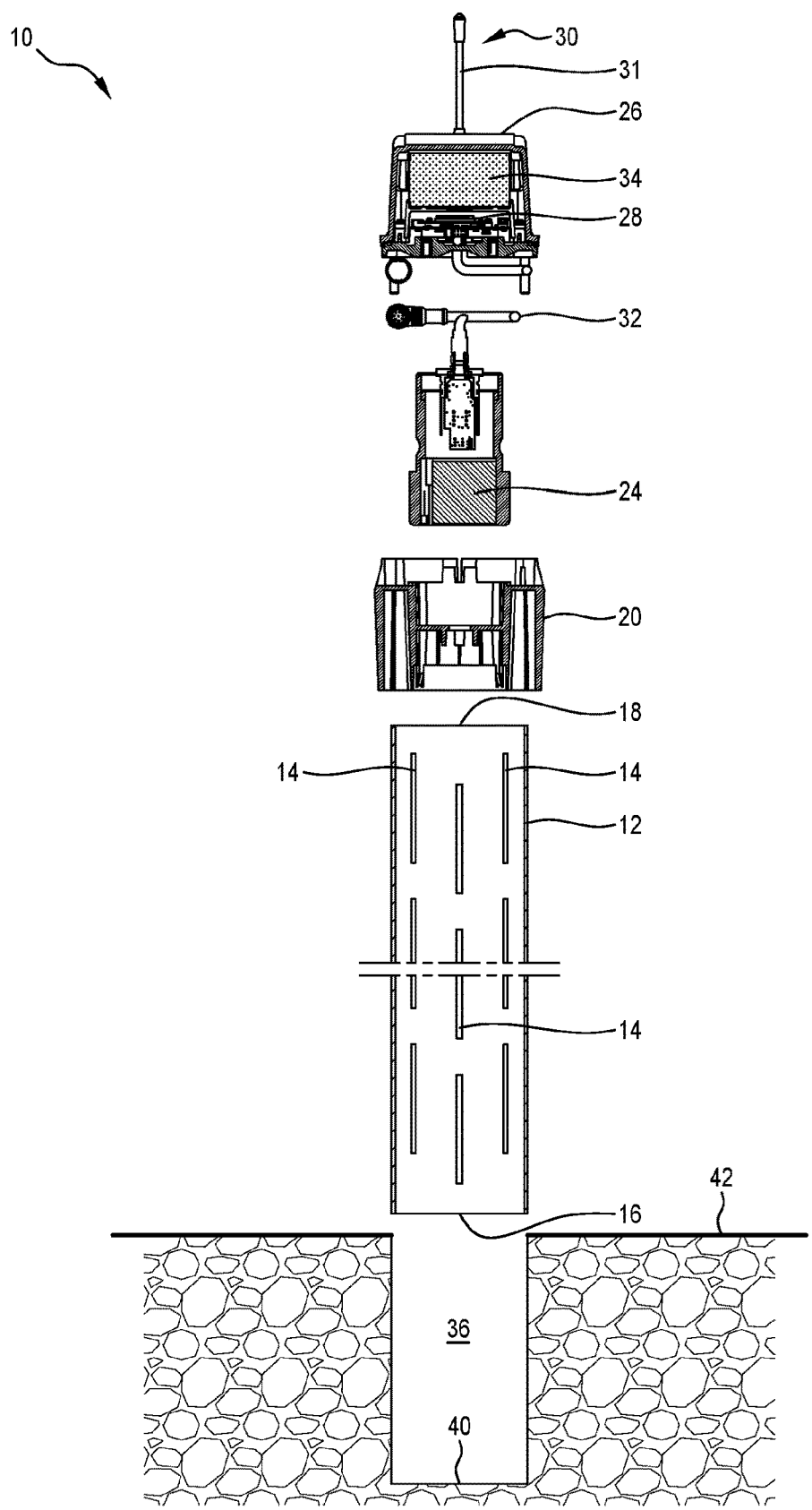
FIG. 1 is a longitudinal exploded cross-sectional view of a first embodiment of an irrigation infiltration device made in accordance with the present invention.
Figure 2:
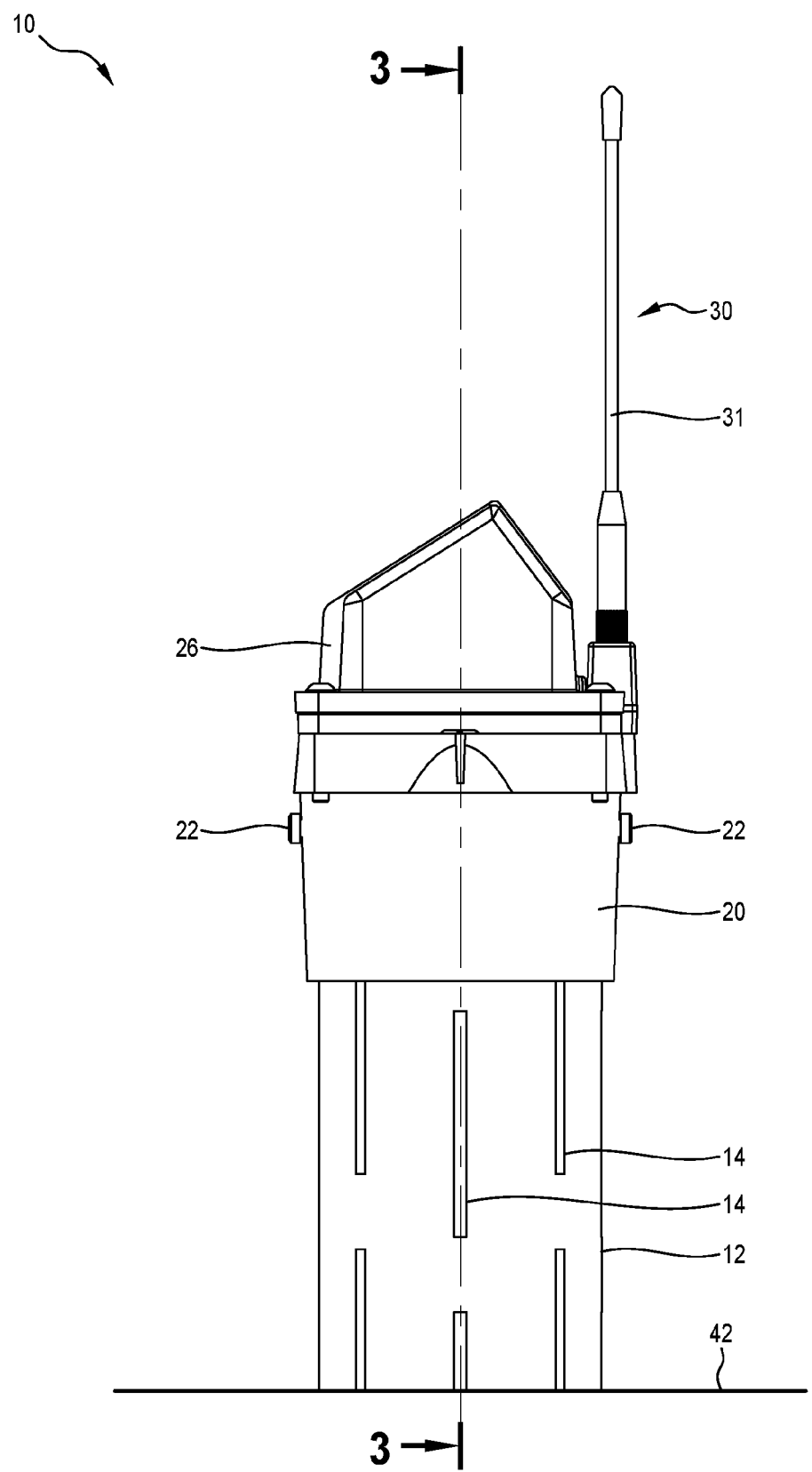
FIG. 2 is a side view of the irrigation infiltration device of FIG. 1 inserted into the ground.
Figure 3:
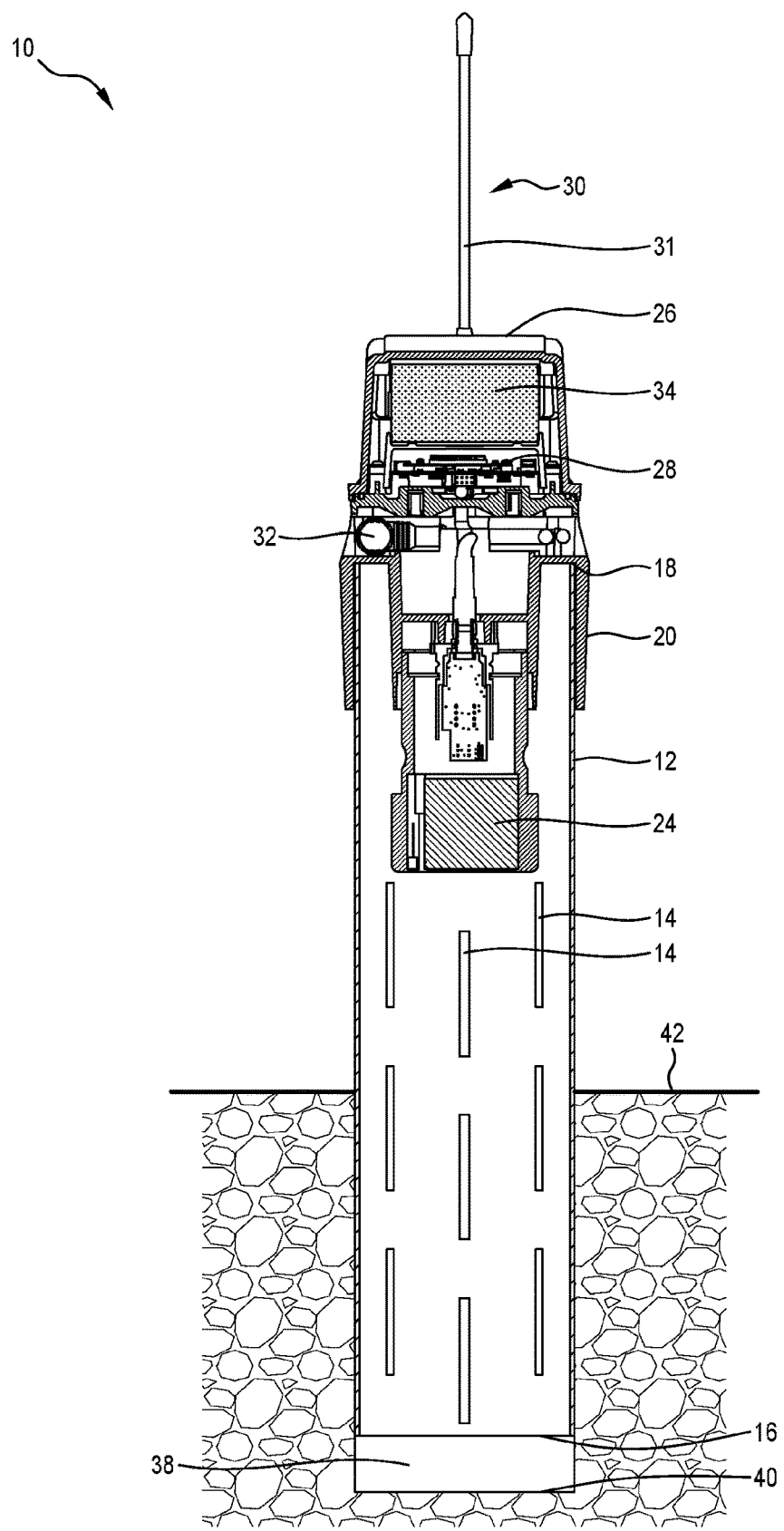
FIG. 3 is a cross-sectional view along and in the direction of arrows 3-3 in FIG. 2.

In FIGS. 1 to 3 of the drawings there is shown a surface irrigation device 10 having a cylindrical tube 12 with longitudinal slots 14 along the length of the tube. Slots 14 are typically arranged in opposing pairs and tube 12 can be formed from a slotted pipe manufactured by Iplex Pipelines in Australia. Slots 14 can be substituted by any shaped perforation and tube 12 can be of any suitable shape e.g. square or polygonal. Tube 12 has a first open end 16 at its base and a second open end 18 at its top. A holder 20 slides over second open end 18 and can be secured to tube 12 by screws 22 or any other affixing method.

A programmable ultrasonic transducer 24 for transmitting and receiving acoustic signals from the water level within tube 12 is attached to holder 20. A housing 26 contains electronic circuitry 28 and wireless communication elements 30 to control said programmable ultrasonic transducer and provide measured characteristics to a remote networked computer system (not shown). Wireless communication elements 30 can include a LoraWan protocol system for an IoT device, radio wave communication or other suitable system. Housing 26 is fitted to holder 20 in a watertight manner A wiring loom 32 will link programmable ultrasonic transducer 24 to electronic circuitry 28. The electronic circuitry 28 can be powered by a battery 34, or rechargeable through a solar cell (not shown).

In use, the tube 12 is pressed into an augured hole 36 leaving a space between the bottom 40 of hole 36 and the first open end 16 of tube 12. Tube 12 is only partially inserted into hole 36 to ensure that programmable ultrasonic transducer 24 does not make contact with water (not shown). Irrigation water can flow along ground level 42 and enter tube 12 through slots 14 above ground level. Tube 12 will be filled in the same manner as cup 24 in our International Patent Application No. PCT/AU2010/001125 and reference should be made to that document for further explanation. The method of irrigation described in our International Patent Application No. PCT/AU2010/001125 is commonly referred to as border check. The method of determining the cut-off point could equally apply to furrow irrigation. The volumes computed would be the volume above surface for the furrow and the infiltration volume for the furrow.

In PCT/AU2010/001125 the following assumptions are made with respect to the geometry associated with water flowing down a bay in order to compute the cut-off point:

The water passes at a constant depth above the surface level $d_s$; and

The water infiltrated into the soil, equivalent to depth $d_i$, is constant down the bay Further refinement of the method to compute the cut-off point, b, will be to analyze data from prior irrigations in order to accurately describe mathematically the shape of the water front (and therefore the volume above the surface level) as it passes over a crop of known:

Crop type and variety

Stage of growth

Relative health and density of crop

Slope of the bay

Soil type (standard soil classification based on the percentage mix of sands, silt and clay)

Soil moisture content at the time of irrigation

This data can be related to the bay in question or obtained from other bays in which this technique is employed.

The slotted tube 12 of the present embodiment provides a number of benefits, apart from having the required instrumentation contained in housing 26 and holder 20 at the desired height above the hole 36, as follows;

1. The slots 14 act as a filter and reduce soil and sediment entering tube 12 and filling the tube over time.
2. The slots 14 and the first open end 16 of tube 12 allow the water to drain following an irrigation (water passing surface irrigation device 10).
3. The device 10 can continue to measure the water level as it drains from tube 12 through the bottom and side soil. Measuring the rate at which the water drains from tube 12 will provide a relative measure of the infiltration characteristics of the soil. The infiltration characteristics of the soil is useful information in determining the optimal time to irrigate and how much water to apply. The infiltration rate can also be used to determine the soil type.
4. When residue builds up in tube 12 over time, the instrumentation can be removed for ready access to remove any build up inside tube 12.

Further refinement of the method will be to compute the depth of infiltration, $d_i$, as it varies and as a function of the distance from the bay outlet. This approach will use the infiltration characteristics of the soil and will be based on:

Infiltration rate of water into the soil as a function of the time water is above the surface; and Soil moisture content at the time of irrigation The time water is above the soil can be computed from previous irrigations the time the depth of water above the surface, $d_s$, and as shown in FIG. 3 of our International Patent Application No. PCT/AU2010/001125.

In a further embodiment the surface irrigation device 10 can be used to detect the time of arrival of a water front advancing along the area being irrigated by the filling of slotted tube 12. This measurement may co-exist or be independent of the detection of the point of change as previously discussed in this specification and in International Patent Application No. PCT/AU2010/001125. The filling of slotted tube 12 with water will be detected and measured. The measurements can then be used to confirm the time of arrival of the water front and provide feedback as to when irrigation can be halted.

Figure 4:
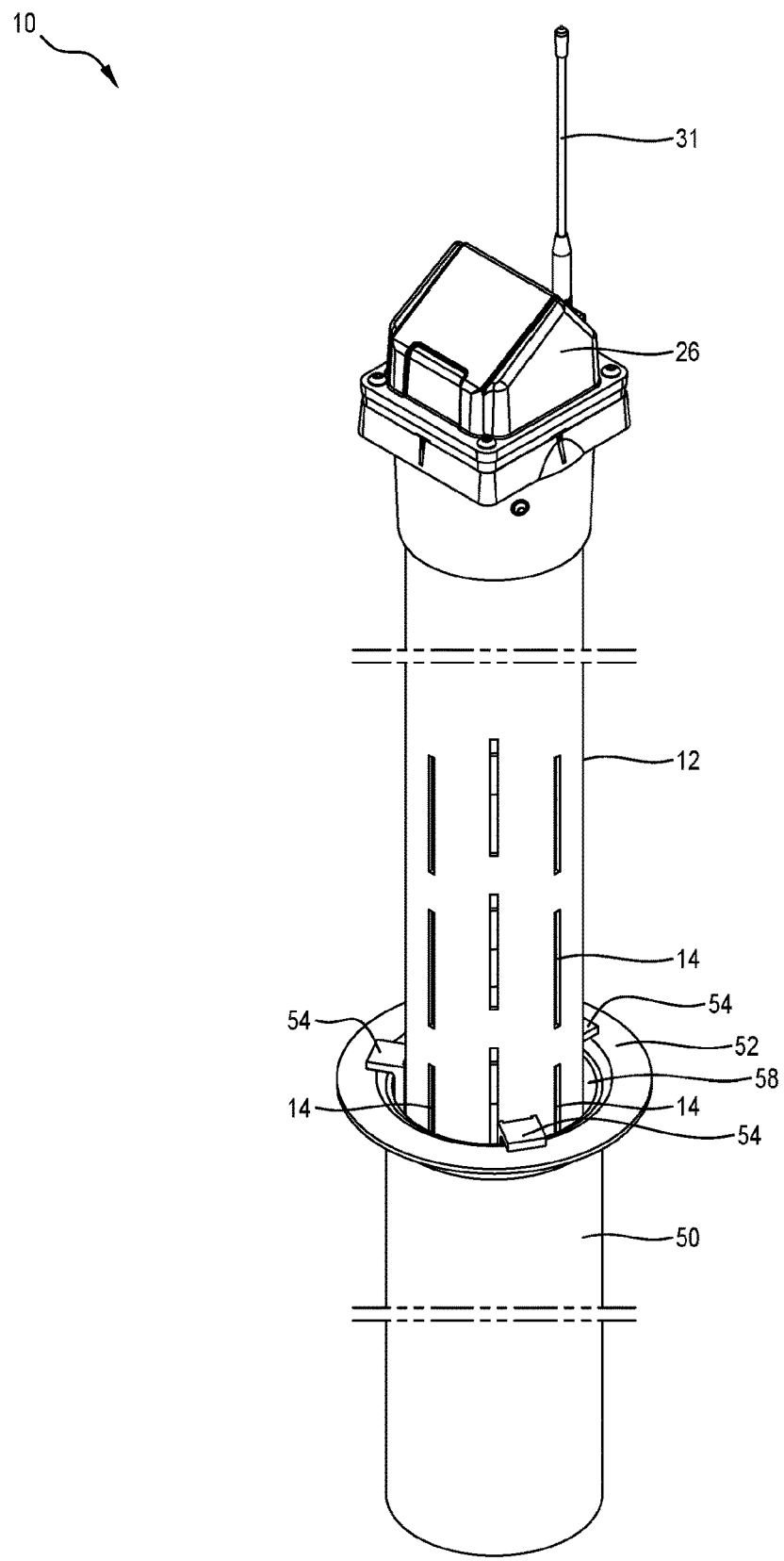
FIG. 4 is a perspective view of a second embodiment of an irrigation infiltration device made in accordance with the invention.
Figure 5:
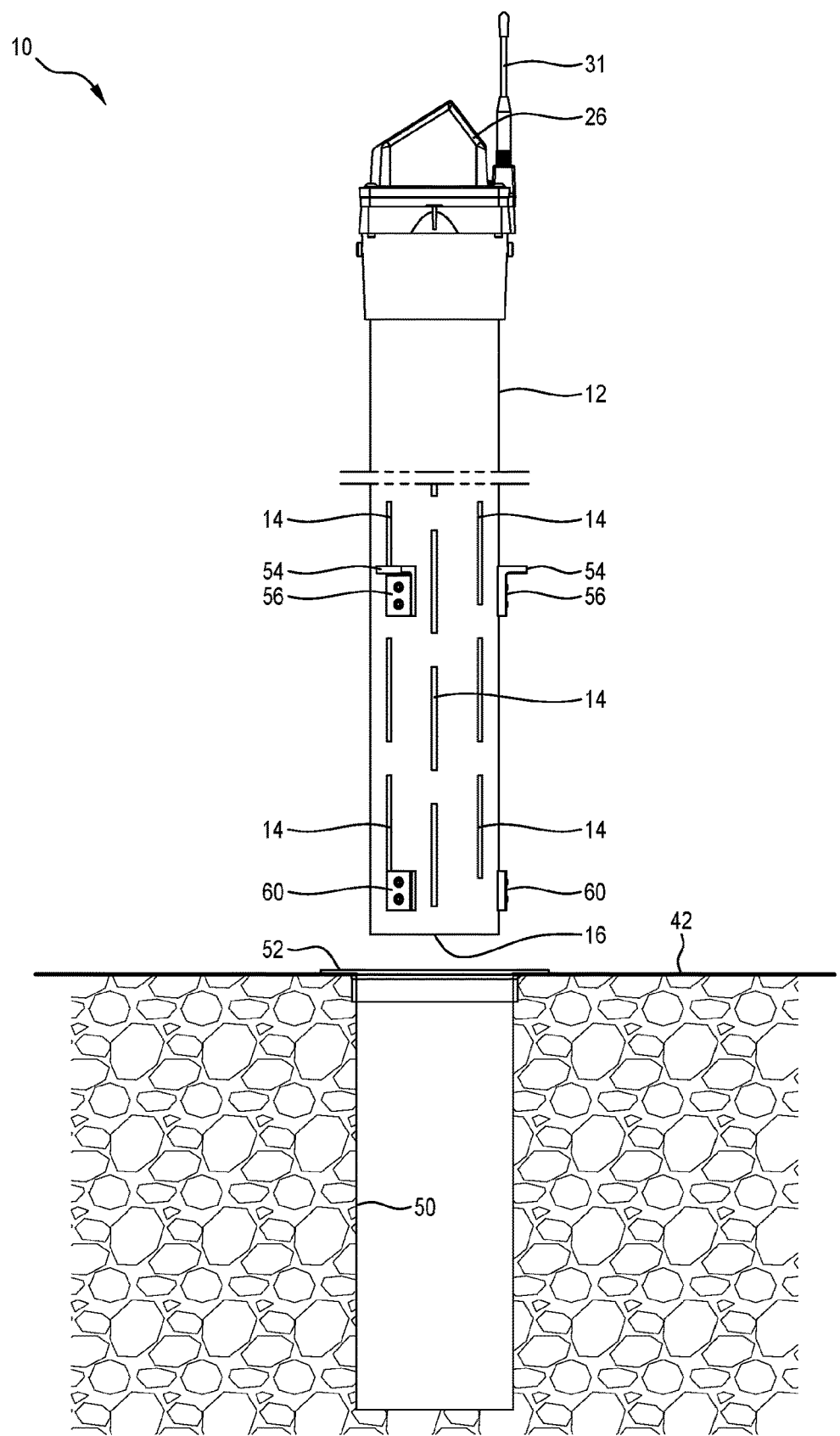
FIG. 5 is a side view of the irrigation infiltration device of FIG. 4 prior to insertion into the ground.
Figure 6:
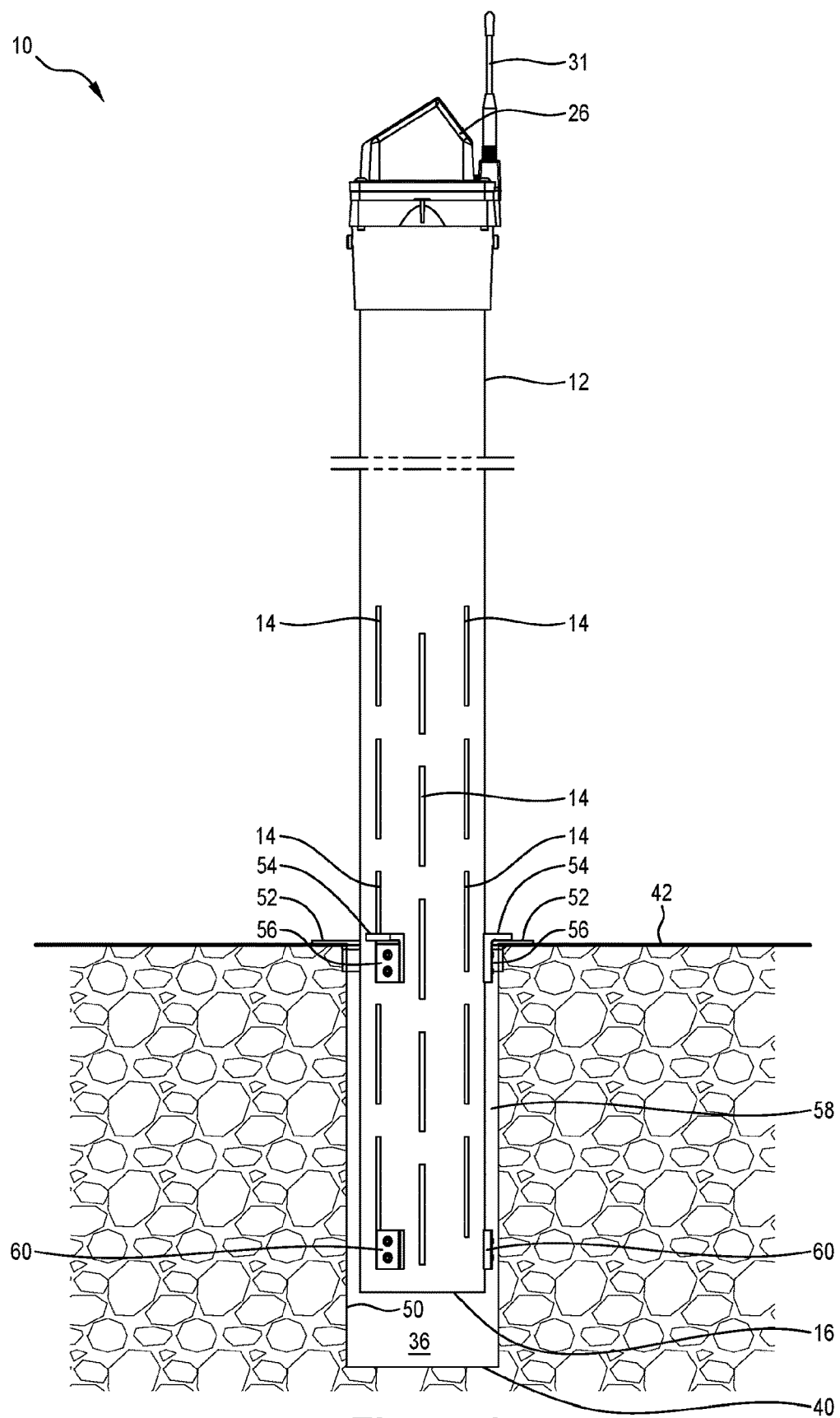
FIG. 6 is the same view as FIG. 5 with the irrigation infiltration device inserted into the ground.

FIGS. 4 to 6 illustrate a second embodiment of the invention. The components and operation of the preferred embodiment shown in FIGS. 1 to 3, where applicable, will not be repeated here in order to avoid unnecessary repetition of description. A second tube 50 is inserted into augured hole 36. A circumferential flange 52 at the top of second tube 50 will limit the depth of insertion of tube 50 into augured hole 36 and seal hole 36 to prevent ingress of moisture. The positioning of tube 12 into second tube 50 will be limited by ledges 54 affixed to the outside of tube 12. Ledges 54 will, in use, rest on circumferential flange 52 as shown in FIGS. 4 and 6. The depending legs 56 of ledges 54 will ensure that a circumferential gap 58 is provided between the inner wall of second tube 50 and the outer wall of tube 12. Spacers 60 on the outer wall of tube 12 will stabilise tube 12 and ensure that the circumferential gap 58 is maintained.

In use, water enters tube 12 through circumferential gap 58 between the inner wall of second tube 50 and the outer wall of tube 12. Air can escape from the top of the tube 12 allowing the inner tube 12 to fill and normalise to the water level between tubes. Water can also enter through slots 14. Water drains through the bottom 40 of hole 36. As tube 12 can be readily removed from second tube 50 there can be multiple tubes 50 in the area to be irrigated. The removal of tube 12 allows the harvest of a crop without damaging device 10.

Figure 7:
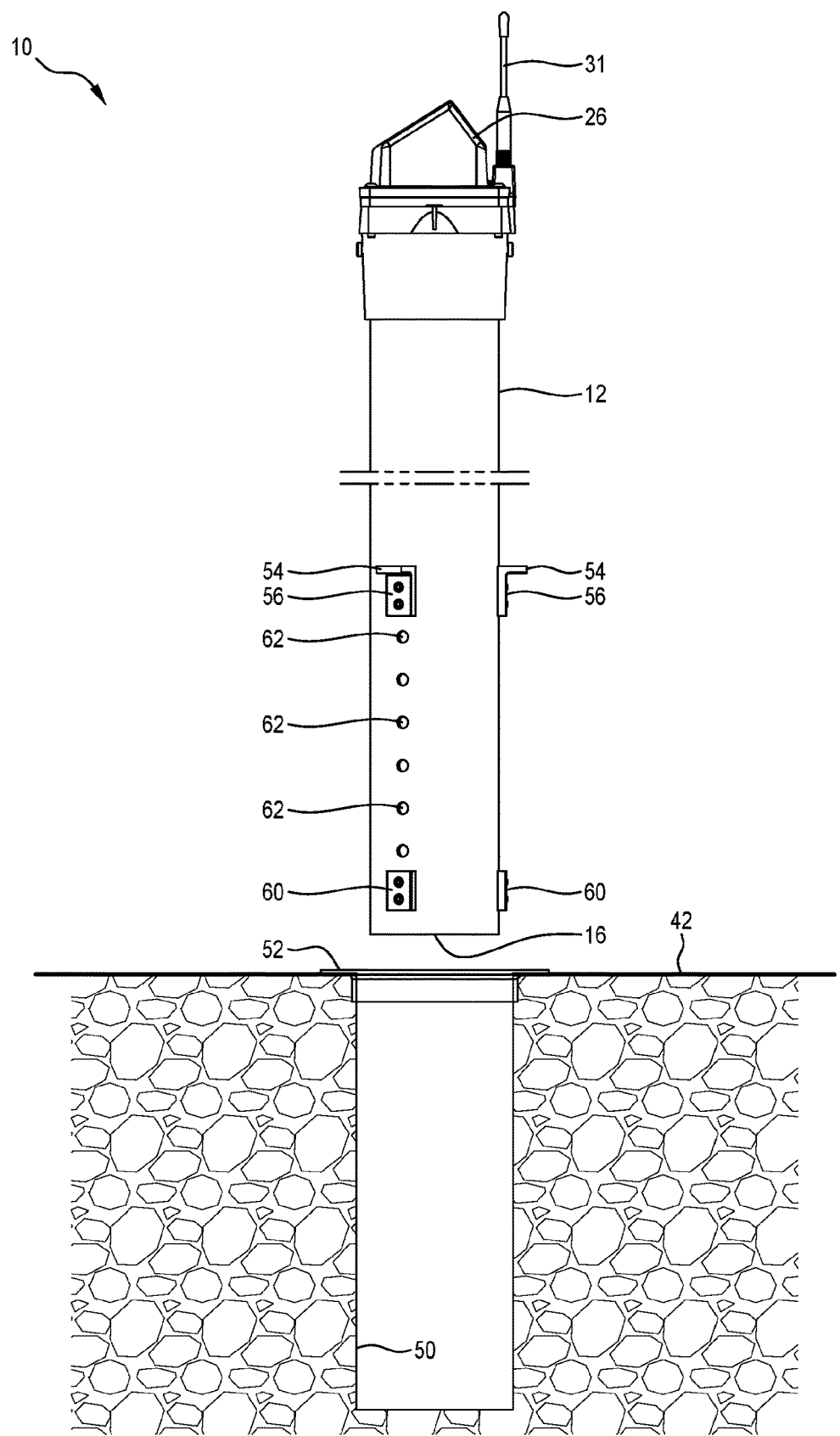
FIG. 7 is a side view of a third embodiment of an irrigation infiltration device made in accordance with the invention 4 prior to insertion into the ground.
Figure 8:
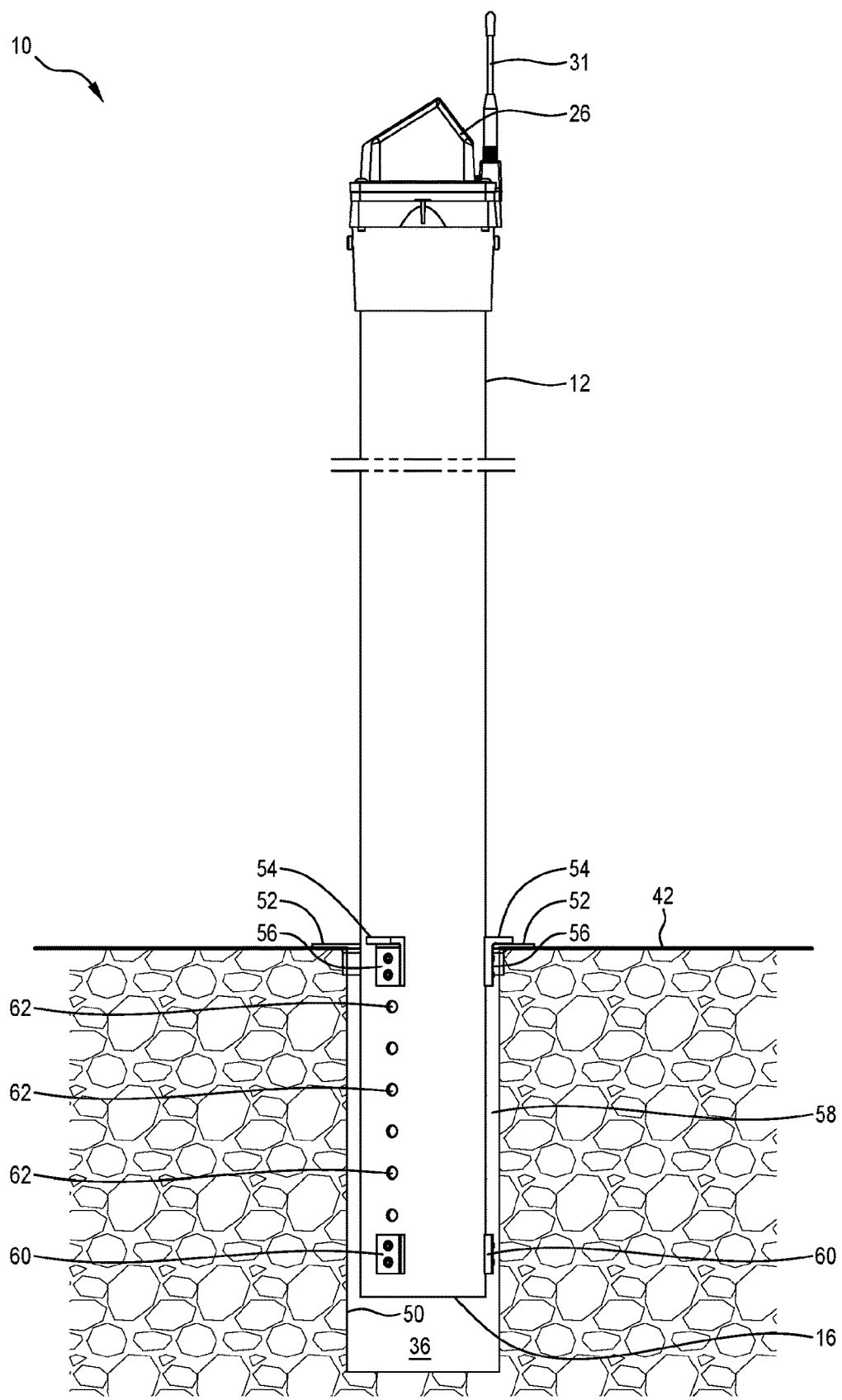
FIG. 8 is the same view as FIG. 7 with the irrigation infiltration device inserted into the ground.

FIGS. 7 and 8 illustrate a third embodiment of the invention. The components and operation of the preferred embodiment shown in FIGS. 1 to 6, where applicable, will not be repeated here in order to avoid unnecessary repetition of description. In this embodiment, tube 12 is non-slotted. If required, holes 62 can be provided to allow the position of ledges 54 and spacers 60 to be adjusted to suit setup requirements. Air can escape from the top of the tube 12 allowing the inner tube 12 to fill and normalise to the water level between tubes. Water can also enter through holes 62. Water drains through the bottom 40 of hole 36. As tube 12 can be readily removed from second tube 50 there can be multiple tubes 50 in the area to be irrigated. The removal of tube 12 allows the harvest of a crop without damaging device 10.

Figure 9:
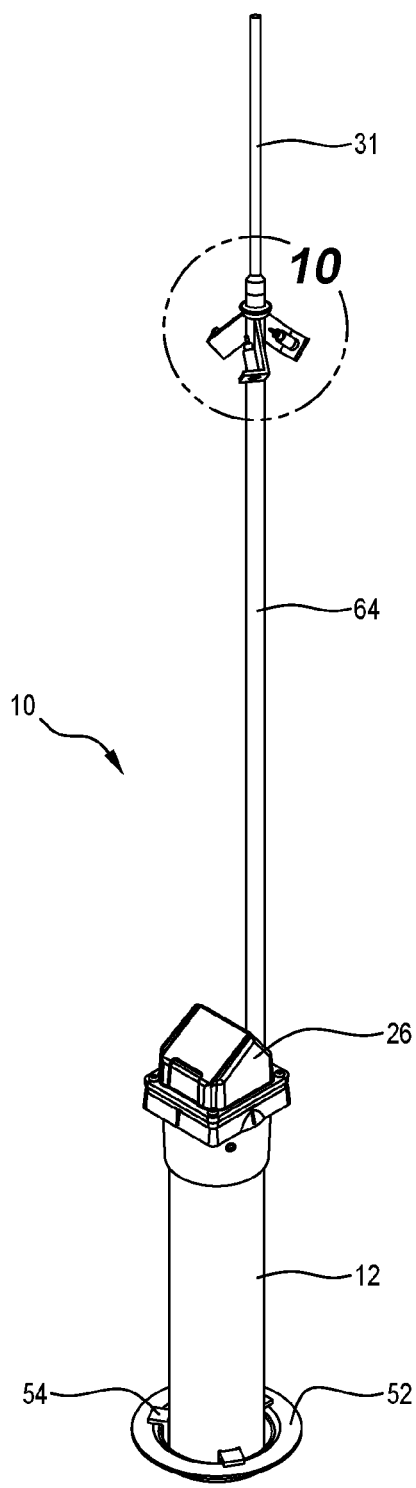
FIG. 9 is a perspective view of the irrigation infiltration device of FIG. 7 with an extended antenna carrying radiometers for measurement of leaf temperature.
Figure 10:
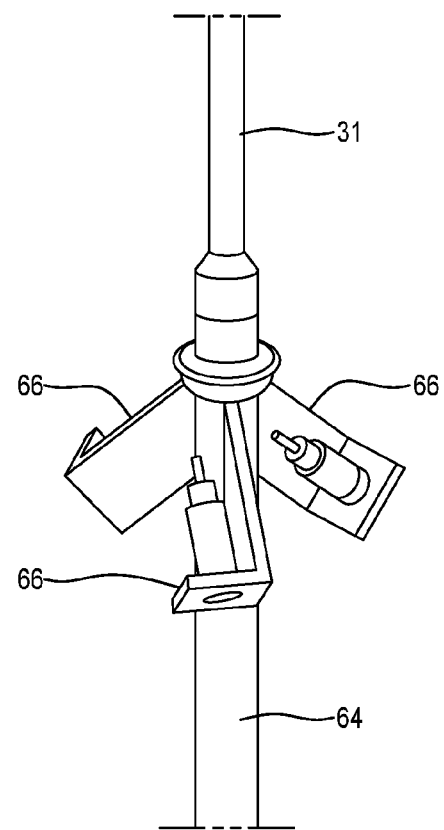
FIG. 10 is an enlarged view of the circled area 10 in FIG. 9.

FIGS. 9 and 10 shows antenna 31 that can be fitted to a cylindrical sleeve 64 attached to housing 26. This arrangement can be provided to any of the embodiments shown in FIGS. 1 to 8. L-shaped brackets 66 are attached to cylindrical sleeve 64. The number and position of L-shaped brackets 66 can be varied according to requirements. Each bracket 64 has an infrared thermal sensor or radiometer 68 installed thereon pointing downwardly towards a crop canopy (not shown) to measure leaf temperature. The infrared thermal sensor or radiometers 68 can be coupled to the electronic circuitry 28.

In a further embodiment antenna 31 could be as shown in FIGS. 1 to 8. Cylindrical sleeve 64 with brackets 66 may be mounted separately to housing 26. Such a change would reduce the height of the combination of cylindrical sleeve 64 and antenna 31. Temperature and humidity sensors (not shown) may be located in tube 12. They will provide important measurements in deriving crop stress determined by infrared thermal sensor or radiometer 68.

Embodiments of the invention have been described above by way of non-limiting example only. Variations and modifications to the embodiments may be made without departing from the scope of the invention.

The invention claimed is:

1. An irrigation measurement device to determine water advance along an area to be irrigated, said device comprising:
   a first open-ended tube;
   a second open-ended tube adapted to be inserted into a hole in soil to be irrigated and having an open upper end, the first open-ended tube being partially insertable into the open upper end of the second open-ended tube so as to enable water to enter through a circumferential inlet gap at the open upper end and between said first and second open-ended tubes with air escaping from a top of said first open-ended tube allowing said first open-ended tube to fill through at least one perforation in the first open-ended tube and normalize to a water level inside said second open-ended tube; and
   a housing secured to said first open-ended tube and containing a programmable ultrasonic transducer for transmitting and receiving acoustic signals from the water level within said first open-ended tube, said housing having electronic circuitry and wireless communication elements to control said programmable ultrasonic transducer and provide measured characteristics to a remote networked computer system,
   the first open-ended tube being removable from the second open-ended tube through the open upper end.

2. The irrigation measurement device as claimed in claim 1, wherein said second open-ended tube has a first circumferential flange at the open upper end to seal said hole.

3. The irrigation measurement device as claimed in claim 2, wherein said first open-ended tube includes external protruding ledges or a second circumferential flange which seat on said first circumferential flange to define a depth of entry of said first open-ended tube into said second open-ended tube.

4. The irrigation measurement device as claimed in claim 1, wherein, wherein a rate at which the water drains from said tubes, as measured by said programmable ultrasonic transducer, provides a relative measure of infiltration characteristics of the soil to allow determination of a soil type and provide information in determining an optimal time to irrigate and how much water to apply.

5. The irrigation measurement device as claimed in claim 1, wherein said wireless communication elements includes an antenna.

6. The irrigation measurement device as claimed in claim 5, further including a sleeve fitted to said housing, whereby a free end of said sleeve includes at least one infrared thermal sensor or radiometer coupled to said electronic circuitry to measure leaf temperature of a crop to be irrigated.

7. The irrigation measurement device as claimed in claim 6, wherein said antenna is fitted to a top of said sleeve.

8. The irrigation measurement device as claimed in claim 1, further including temperature and humidity sensors located in said first open-ended tube secured to said housing.

9. An irrigation measurement device to determine water advance along an area to be irrigated, said device comprising:
a first open-ended tube;
a second open-ended tube adapted to be inserted into a hole in soil to be irrigated and having an open upper end, the first open-ended tube being partially insertable into the open upper end of the second open-ended tube, said first open-ended tube having a plurality of perforations along a length and periphery of the first open-ended tube to allow water to enter said perforations, and enabling water to enter through a circumferential inlet gap at the open upper end and between said first and second open-ended tubes, and said perforations of said first open-ended tube allowing said first open-ended tube to fill; and
a housing secured to said first open-ended tube containing a programmable ultrasonic transducer for transmitting and receiving acoustic signals from a water level within said first open-ended tube, said housing having electronic circuitry and wireless communication elements to control said programmable ultrasonic transducer and provide measured characteristics to a remote networked computer system,
the first open-ended tube being removable from the second open-ended tube through the open upper end.

10. The irrigation measurement device as claimed in claim 9, wherein said plurality of perforations are longitudinal slots.

11. The irrigation measurement device as claimed in claim 10, wherein said longitudinal slots are arranged in opposing pairs along the length of the first open-ended tube.

12. The irrigation measurement device as claimed in claim 9, wherein a rate at which the water drains from the first open-ended tube, as measured by said programmable ultrasonic transducer, provides a relative measure of infiltration characteristics of the soil.

13. The irrigation measurement device as claimed in claim 12, wherein the infiltration characteristics are used to determine soil type.

14. The irrigation measurement device as claimed in claim 12 wherein said measured infiltration characteristics include a depth of water in said first open-ended tube whereby monitoring of the depth of water in said first open-ended tube indicates arrival of a water front of said water advance along said area to be irrigated.

* * * * *